UNITED STATES PATENT OFFICE.

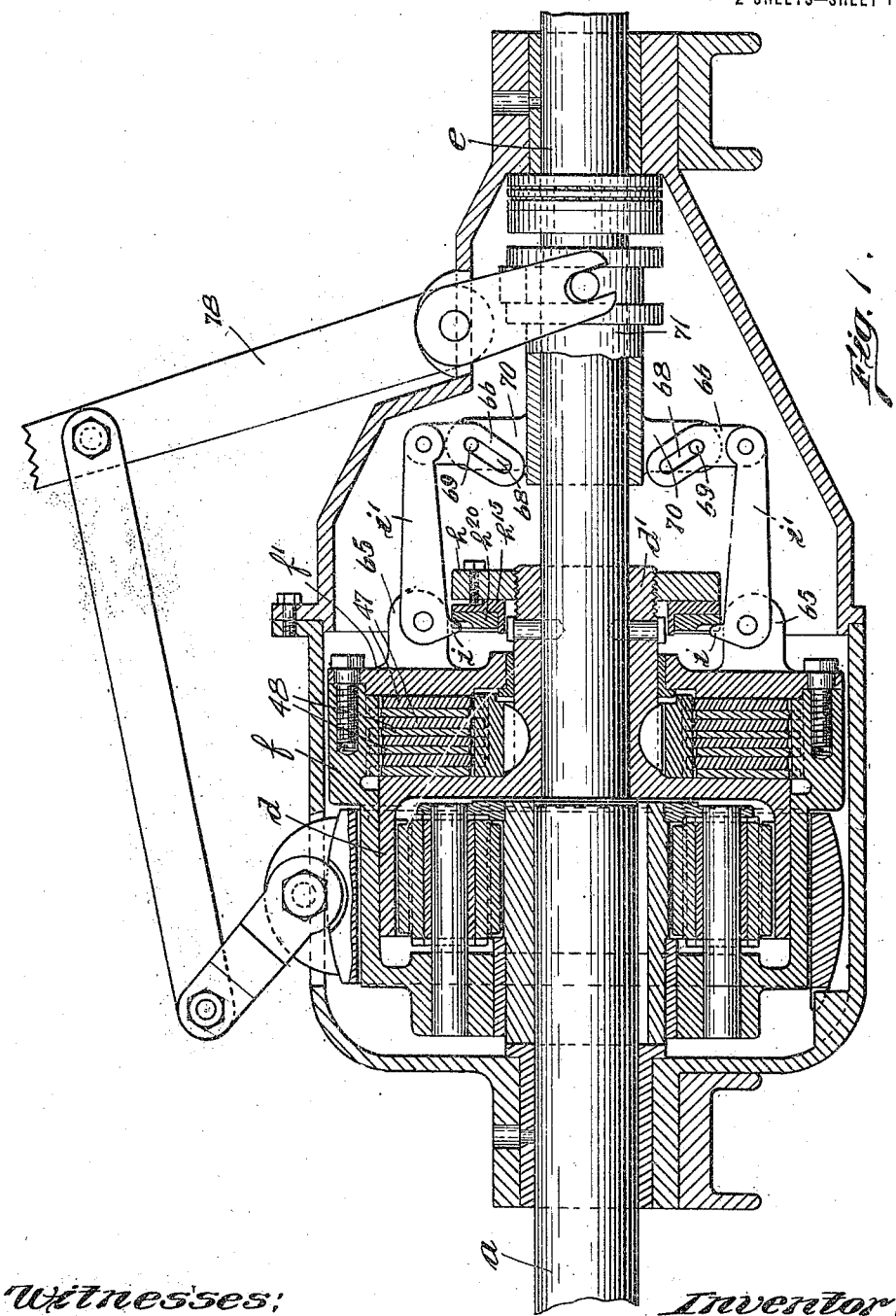

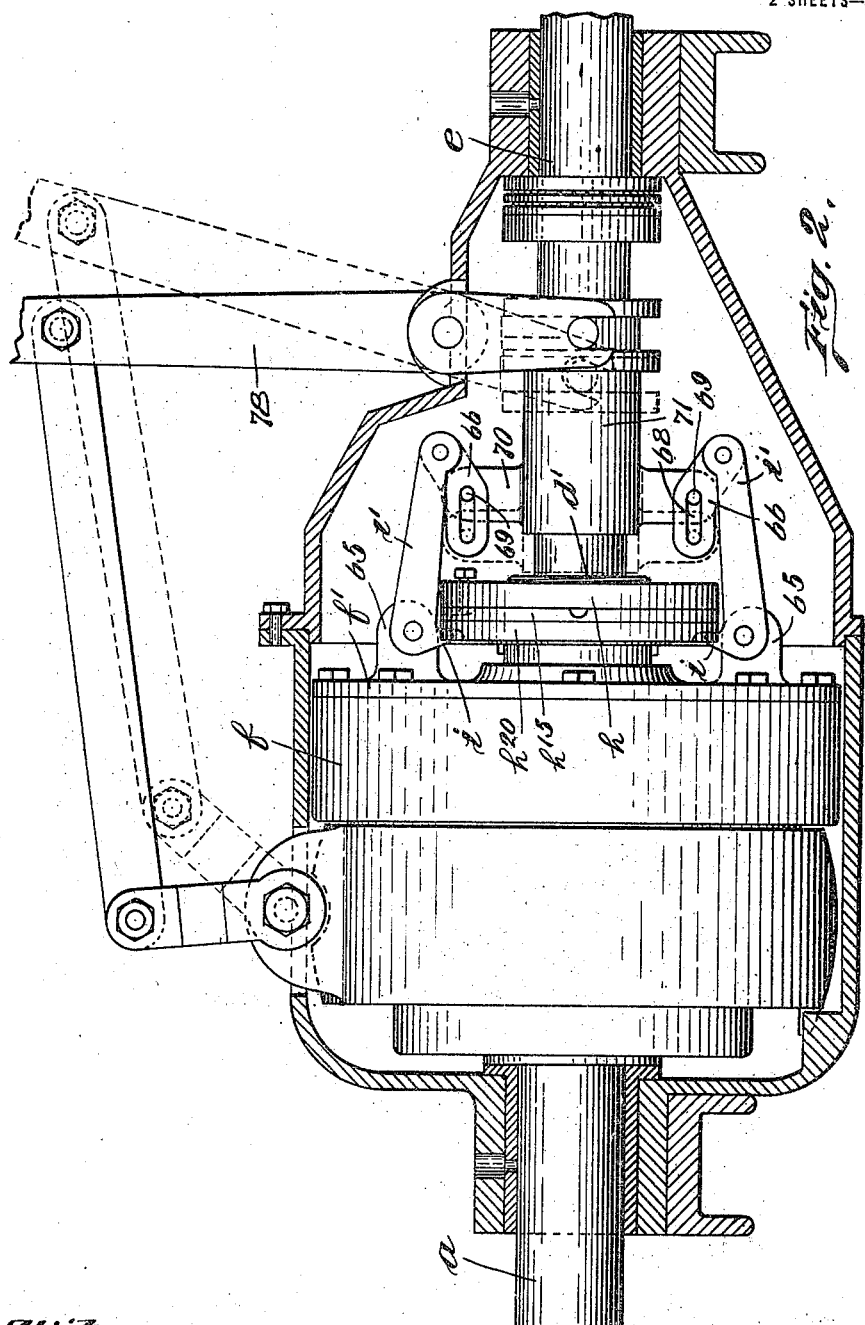

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION OF MASSACHUSETTS.

CLUTCH MECHANISM FOR REVERSING-GEARING.

1,260,599.              Specification of Letters Patent.     Patented Mar. 26, 1918.

Original application filed May 26, 1911, Serial No. 629,596. Divided and this application filed February 18, 1915. Serial No. 9,139.

*To all whom it may concern:*

Be it known that I, HENRY A. TUTTLE, a citizen of the United States, residing at Taunton, in the county of Bristol and State of Massachusetts, have invented an Improvement in Clutch Mechanism for Reversing-Gearing, of which the following is a specification.

The invention relates to an improvement in clutches and more particularly to a means for operating the clutch to cause the clutch-plates to be moved into frictional engagement. The clutch here shown is designed for use in connection with reversing-gearing such as is embodied in my application #629,596, filed May 26, 1911, of which this application is a division.

In clutches of this type, the means usually employed for forcing the clutch-plates into frictional coöperation has comprised a series of pivoted levers arranged to move the clutch-plates, having their free ends arranged for slidable engagement with a cone-member, which is actuated by a shifting-lever to move said levers on their pivots to secure the desired action. This construction necessarily involves a considerable space for the moving parts, as the pitch of the cone cannot be made too steep nor the levers coöperating therewith too short, as otherwise great power is required to move the shifting-lever to advance the cone and spread the levers. Hence, in those instances where space is of importance, this type of operating-means is objectionable.

Furthermore, when employing a cone as the operating element for the actuating-levers, said cone is usually so formed that when thrust forward to spread the levers, the latter will become locked, otherwise locking-means must be provided for the shifting-lever or the associated parts will have a tendency to slip backward, which is, at times, very annoying.

The present invention is designed to present an operating-means in which the cone-element is entirely dispensed with, and the actuating-levers may be materially reduced in length, and the means for operating said levers maintained substantially within the longitudinal length or plane of the levers, to minimize the amount of space required for the associated parts. Furthermore, the connection of the levers to the operating-means is such as to induce the maximum leverage with minimum of exertion, with the effect to insure a steady, even and positive coöperation between the clutch-plates.

Furthermore, the construction of the levers and operating-means is such that the levers are positively held in clutch-operating position, thereby obviating the locking-means; and, also, is or may be such as to permit movement of the shifting-lever independent of said levers, such independent movement of the shifting-lever being employed for the purpose of operating a brake-mechanism to effect reverse drive or for performing some other function.

In the essential detail the improved operating-means consists in providing a series of pivoted levers having toe-portions, that is to say, portions with projections, said levers being pivotally mounted and operating through the medium of their toe-portions or projections to actuate the clutch operating-member. The ends of the levers remote from the clutch operating-member are provided with pivoted links, which engage pins projecting from ears on a manually operable longitudinally sliding-member. These links are here shown as having elongated slots, particularly, for the purpose of permitting independent movement of the shifting-lever.

In the accompanying drawings:—

Figure 1 represents a longitudinal vertical section through the clutch, illustrating one position of the clutch operating-means.

Fig. 2 is a side elevation of the clutch, illustrating respectively in full and dotted lines two other positions of the clutch.

In the accompanying drawings, I have illustrated the clutch of my aforesaid application, it being understood however, that the clutch details, *per se*, are immaterial so far as the present invention is concerned, such invention being principally directed to the clutch-operating means. As here shown, the clutch mechanism in its conventional form may be said to include a member $f$ hereinafter termed the driving-member and adapted through any suitable form of connection to be mediately or immediately connected to the driving-shaft $a$, and a driven-member $d$, adapted by any suitable means to be secured to the driven-shaft $e$.

The driving-member $f$ and driven-member $d$ are formed to provide what may be termed a clutch-case, the outer wall of the case being formed by the driving-member, and they are further provided each with a series of recesses constituting clutch-plate recesses, which may be of any usual or preferred formation.

In the form of clutch here shown there is arranged in the case a series of clutch-plates 47, 48, having teeth on their inner or outer peripheral edges and having their adjacent faces formed for clutching coöperation to lock the members in clutched position. To induce this movement of the plates it is obvious that one of the clutch-members is movable axially. For this purpose, in the conventional form of the clutch shown, the driving-member $f$ is mounted for sliding coöperation with the driving-shaft to a limited degree, the said member being held against movement independent of the shaft other than the slight relative sliding movement described.

The present invention is concerned primarily with means for operating the sliding or axially movable member so as to induce the clutching coöperation of the plates arranged within the case, and the particular structure to be hereinafter described is designed to materially decrease the length of space required for such part or parts while at the same time providing for a comparatively easy manual movement and the development in such movement of sufficient leverage to insure a proper frictional engagement.

Such operating-means as here shown include levers $i'$, pivotally mounted on ears 65 projecting from the wall $f'$ of the driving-member which forms one wall of the clutch-case. The relatively inner ends of these levers are formed with projections or toes $i$ designed to coöperate with the ring $h^{20}$ appropriately recessed to receive the toes, the ring being supported upon an annular plate $h^{15}$, adjustably secured by a screw to a collar $h$, threaded upon the forward or extended end of the hub-portion $d'$ of the driven-member $d$. The outer ends of the levers $i'$ are preferably bifurcated and carry pivotally connected therewith, obtuse-angled links 66, so constructed that when the outer or lever-connected ends of the links are at approximately right angles to the levers proper, the inner or free ends of the links are at an inwardly extending obtuse angle. Elongated slots 68 are formed practically throughout the length of the obtuse-angled portions of the links, and pins 69 are arranged to be received within and coöperate with the slots, the pins projecting from ears 70 which extend radially from a sleeve 71 slidably mounted upon the driven shaft $e$. The sleeve is adapted for manual manipulation, that is, movement longitudinally of the driven-shaft through any appropriate means, such for example as a hand-lever 78 pivotally supported upon any suitable fixture, and approximately engaging the sleeve to cause reciprocation of the latter in the respective movements of the lever. The shifting-lever is designed to occupy three different positions. In its middle or normal position, the links are folded inward, and the pins are disposed at the outer ends of the slots and in such position the clutch is released. In its forward position from normal, the pins engaging the ends of the slots of the links act to move said links on their pivots, and thereby move the pivoted levers, swinging their outer ends in an outward direction, and the toes of the levers being held against movement, other than a swinging movement about the pivots of the levers, the axially movable clutch-member will be moved to cause the clutch-plates to engage each other and thereby set the clutch. In its rearward position from normal, the pins move freely along in the slots of the links and the links and associated parts are not moved, thus permitting of an independent movement of the shifting-lever for the accomplishment of some other result, as, for instance, as here shown, for the setting of the brake-mechanism of a reverse-gearing which is here illustrated.

I claim:—

1. A clutch-mechanism for reversing gearing connecting a driving-shaft and a driven-shaft, said mechanism involving an axially movable clutch-operating member, pivoted levers for operating said member, a slidable sleeve, slotted links carried by the levers, pins carried by the sleeve and adapted to operate within the slots of the links, the slotted portion of said links being arranged so that said sleeve is slidable in one direction from normal to abnormal position for operatively moving the levers whereby the clutch-member will be operated, and is slidable in the opposite direction from normal to abnormal position, for holding the levers from movement on their pivots while the sleeve is being thus moved.

2. A clutch-mechanism for reversing gearing connecting driving and driven-shafts, said mechanism including a relatively fixed portion and a relatively movable portion arranged to actuate or release the clutch, levers formed at their inner ends for coöperation with the respective members to induce operative movement or inoperative movement of the said members in the respective movements of the levers, links carried by the inner ends of the levers and manually operable means arranged on one of the shafts beneath the levers for operably actuating the levers in one movement of said means and for inoperably actuating said levers in another movement of said means.

3. A clutch-mechanism for reversing gearing connecting driving and driven shafts, said mechanism including a relatively fixed portion and a relatively movable portion arranged to actuate or release the clutch, levers formed at their inner ends for coöperation with the respective members to induce operative movement or inoperative movement of the said members in the respective movements of the levers, links carried by the inner ends of the levers, said links being slotted, a sliding sleeve arranged on one of the shafts beneath the levers, means for operating the sleeve, and pins carried by the sleeve to operatively engage the slots of the links in movement of said sleeve in one direction and move said links inward, between the levers and sleeve.

4. A clutch-mechanism for reversing gearing connecting driving and driven shafts, said mechanism including a relatively fixed portion and a relatively movable portion arranged to actuate or release the clutch, levers formed at their inner ends for coöperation with the respective members to induce operative movement or inoperative movement of the said members in the respective movements of the levers, links carried by the inner ends of the levers, said links being of obtused-angled formation, one portion of each link being formed with an elongated slot, a sliding sleeve, pins carried by the sleeve and seated in the slots of the levers and means for operating the sleeve.

5. A clutch-mechanism for reversing gearing connecting driving and driven shafts, said mechanism including relatively movable clutch actuating members, a sliding sleeve, pivotally mounted links having sliding connection with the sleeve and adapted in the movements of the sleeve to be swung inwardly and means intermediate said links and the respective clutch-members which are extended over the sleeve to actuate the clutch members in the respective movements of the links, the links occupying positions between said means and the sleeve.

6. A clutch-mechanism for reversing gearing connecting a driving and driven-shaft, including an axially movable clutch operating-member, pivoted levers arranged to move said clutch operating-member axially, having toes adapted to engage an abutment, links pivotally connected to said levers and movable inwardly, a sliding-sleeve arranged on one of the shafts having ears to which said links are slidably connected, said sleeve being arranged beneath said levers, and the links arranged between the levers and sleeve, and a pivoted shifting-lever connected with said sleeve for moving it back and forth.

7. A clutch-mechanism for reversing gearing connecting a driving and driven-shaft, including a clutch operating-member, pivoted levers for operating said member, a sliding-sleeve arranged on one of the shafts beneath said levers, slotted links carried by the levers and arranged between the levers and sleeve, pins carried by the sleeve and adapted to operate in the slots of the links and to move said links inward, said sleeve being slidable in one direction from normal to abnormal position for operatively moving the levers in one direction, and said sleeve being slidable in the opposite direction from normal, whereby the pins are caused to move in the slots without operatively moving the levers.

In testimony whereof, I have signed my name to this specification in the presence of two subscribing witnesses.

HENRY A. TUTTLE.

Witnesses:
B. J. NOYES,
H. B. DAVIS.